US012720154B2

(12) United States Patent
Yang et al.

(10) Patent No.: US 12,720,154 B2
(45) Date of Patent: Aug. 25, 2026

(54) TRANSMISSION SYSTEM AND TRANSMISSION METHOD

(71) Applicant: BOE TECHNOLOGY GROUP CO., LTD., Beijing (CN)

(72) Inventors: Jun Yang, Beijing (CN); Feng Feng, Beijing (CN); Baoyu Shi, Beijing (CN); Tao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/864,981

(22) PCT Filed: May 4, 2023

(86) PCT No.: PCT/CN2023/091950

§ 371 (c)(1),
(2) Date: Nov. 12, 2024

(87) PCT Pub. No.: WO2023/246317

PCT Pub. Date: Dec. 28, 2023

(65) Prior Publication Data

US 2025/0310598 A1 Oct. 2, 2025

(30) Foreign Application Priority Data

Jun. 23, 2022 (CN) ........................ 202210720307.3

(51) Int. Cl.
*H04N 21/4363* (2011.01)
*H04N 19/42* (2014.01)
(Continued)

(52) U.S. Cl.
CPC ....... *H04N 21/43637* (2013.01); *H04N 19/42* (2014.11); *H04N 19/44* (2014.11); *H04N 21/643* (2013.01); *H04W 88/06* (2013.01)

(58) Field of Classification Search
CPC .. H04N 21/43637; H04N 19/42; H04N 19/44; H04N 21/643; H04W 88/06
See application file for complete search history.

(56) References Cited

U.S. PATENT DOCUMENTS

2020/0100125 A1* 3/2020 Sun ....................... H04W 24/08
2023/0032544 A1* 2/2023 Proejts ................ H04B 7/0817

FOREIGN PATENT DOCUMENTS

CN 104427302 A 3/2015
CN 106060468 A 10/2016
(Continued)

OTHER PUBLICATIONS

China Patent Office, First Office Action, Dec. 25, 2023, for corresponding CN application No. 202210720307.3.
(Continued)

*Primary Examiner* — Alazar Tilahun
(74) *Attorney, Agent, or Firm* — HOUTTEMAN LAW LLC

(57) ABSTRACT

The present disclosure provides a transmission system, including: a video source including a source communication module based on a first communication protocol; a transmitting terminal including a first antenna based on a second communication protocol and a first communication module based on the second communication protocol and arranged corresponding to the first antenna; and a receiving terminal including a second antenna based on the second communication protocol and a second communication module based on the second communication protocol and arranged corresponding to the second antenna, a third antenna based on the first communication protocol, and a third communication module based on the first communication protocol and arranged corresponding to the third antenna; the video source is connected to the transmitting terminal through a first interface, the source communication module of the
(Continued)

video source is communicated with the third antenna of the receiving terminal based on the first communication protocol.

18 Claims, 4 Drawing Sheets

(51) Int. Cl.

*H04N 19/44* (2014.01)
*H04N 21/643* (2011.01)
*H04W 88/06* (2009.01)

(56) References Cited

FOREIGN PATENT DOCUMENTS

| | | | |
|---|---|---|---|
| CN | 207869294 | U | 9/2018 |
| CN | 208656897 | U | 3/2019 |
| CN | 110784663 | A | 2/2020 |
| CN | 110868426 | A | 3/2020 |
| CN | 110995292 | A | 4/2020 |
| CN | 110999232 | A | 4/2020 |
| CN | 111083170 | A | 4/2020 |
| CN | 111510763 | A | 8/2020 |
| CN | 112511202 | A | 3/2021 |
| CN | 112929742 | A | 6/2021 |
| CN | 114640879 | A | 6/2022 |
| CN | 115119042 | A | 9/2022 |
| JP | 2010154418 | A | 7/2010 |

OTHER PUBLICATIONS

China Patent Office, Second Office Action, Jul. 15, 2024, for corresponding CN application No. 202210720307.3.

China Patent Office, Rejection, Nov. 18, 2024, for corresponding CN application No. 202210720307.3.

* cited by examiner

TRANSMISSION SYSTEM AND TRANSMISSION METHOD

TECHNICAL FIELD

The present disclosure relates to the field of ultra-high definition video transmission technology, and in particular to a transmission system and a transmission method.

BACKGROUND

The WiFi6 technology (otherwise known as IEEE 802.11.ax) is a sixth generation wireless network technology. In the WiFi6 technology, up to 8 devices are simultaneously, instead of sequentially, communicated with each other by means of the MU-MIMO (multi-user multiple input multiple output) technology at a maximum speed of 9.6 Gbps. In the WiFi6 technology, the efficiency and the network capacity can be improved by means of the OFDMA (orthogonal frequency division multiple access) technology and the transmit beamforming, respectively.

Compared with the previous generation of WiFi5 technology (802.11ac), in terms of frequency bands, the WiFi5 technology only involves 5 GHz, and the WiFi6 technology covers 2.4/5 GHz, which completely covers low-speed and high-speed devices. In terms of the modulation mode, the WiFi6 technology supports 1024-QAM (quadrature amplitude modulation), which is higher than 256-QAM for the WiFi5 technology, so that the data capacity is higher, and the data transmission speed is higher in the WiFi6 technology. Therefore, the maximum transmission speed is increased from 3.5 Gbps for the WiFi5 technology to 9.6 Gbps for the WiFi6 technology, that is, by nearly 3 times in theory.

The millimeter wave technology (802.11ad) is mainly used for realizing the transmission of wireless high definition audio and video signals in a home. A 60 GHz spectrum of a high frequency carrier is used in the millimeter wave technology. The millimeter wave technology can realize the simultaneous transmission in multiple channels under the support of the MIMO technology, and a transmission bandwidth of each channel exceeds 1 Gbps. A carrier frequency is 60 GHz, and a speed is 7 Gbps in the millimeter wave technology.

However, the carrier waves with a carrier frequency of 60 GHz have a poor diffraction capability, and severe signal attenuation in the air, so that the transmission distance and the signal coverage range of the carrier waves are greatly influenced, and the millimeter wave technology can only be applied in a small range.

SUMMARY

An embodiment of the present disclosure provides a transmission system, including: a video source including a source communication module based on a first communication protocol; a transmitting terminal including a first antenna based on a second communication protocol and a first communication module based on the second communication protocol and corresponding to the first antenna; and a receiving terminal including a second antenna based on the second communication protocol and a second communication module based on the second communication protocol and corresponding to the second antenna, a third antenna based on the first communication protocol, and a third communication module based on the first communication protocol and corresponding to the third antenna; wherein the video source is connected to the transmitting terminal through a first interface, wherein the source communication module of the video source is communicated with the third antenna of the receiving terminal based on the first communication protocol, and the first antenna of the transmitting terminal is communicated with the second antenna of the receiving terminal based on the second communication protocol.

In some embodiments of the present disclosure, the transmission system further includes a display terminal; wherein the first communication protocol is a WiFi6-based communication protocol; and the second communication protocol is a millimeter wave based communication protocol.

In some embodiments of the present disclosure, the video source further includes an instruction receiving module and an encoding compression component, and the instruction receiving module is configured to output a first instruction signal for transmitting video data from the video source to the transmitting terminal or a second instruction signal for directly transmitting the video data from the video source to the receiving terminal according to a user input.

In some embodiments of the present disclosure, in response to the instruction receiving module outputting the first instruction signal, the source communication module of the video source is configured to directly transmit first data from the video source to the receiving terminal; the third antenna of the receiving terminal is configured to receive the first data from the video source and transmit the first data to the third communication module corresponding to the third antenna; the third communication module of the receiving terminal is configured to receive the first data from the third antenna, process the first data, and then transmit the processed first data to the display terminal through a second interface for displaying; the encoding compression component of the video source is configured to perform an encoding compression operation on second data from the video source and transmit the encoded and compressed second data to the transmitting terminal through the first interface; the first communication module of the transmitting terminal is configured to receive the encoded and compressed second data from the video source, process the second data, and transmit the processed second data to the first antenna of the transmitting terminal; and the first antenna of the transmitting terminal is configured to receive the processed second data from the first communication module of the transmitting terminal and transmit the processed second data to the receiving terminal.

In some embodiments of the present disclosure, in response to the instruction receiving module outputting the second instruction signal, the encoding compression component is configured to process second data from the video source and transmit the processed second data to the source communication module of the video source; and the source communication module of the video source is configured to receive the processed second data from the encoding compression component and directly transmit the processed second data to the receiving terminal.

In some embodiments of the present disclosure, the transmitting terminal includes an encoding compression component; the source communication module of the video source is configured to directly transmit first data from the video source to the receiving terminal; the third antenna of the receiving terminal is configured to receive the first data from the video source and transmit the first data to the third communication module corresponding to the third antenna; the third communication module of the receiving terminal is configured to receive the first data from the third antenna, process the first data, and then transmit the processed first data to the display terminal through a second interface for displaying; the video source is configured to transmit the second data to the transmitting terminal through the first interface; the encoding compression component of the transmitting terminal is configured to receive the second data from the video source, perform an encoding compression operation on the second data from the video source, and transmit the encoded and compressed second data to the first communication module of the transmitting terminal; the first communication module of the transmitting terminal is configured to receive the encoded and compressed second data, process the second data, and transmit the processed second data to the first antenna of the transmitting terminal; and the first antenna of the transmitting terminal is configured to receive the processed second data from the first communication module of the transmitting terminal and transmit the processed second data to the receiving terminal.

In some embodiments of the present disclosure, the third communication module of the receiving terminal is further configured to receive a signal from the display terminal through the second interface, process the signal, and transmit the processed signal to the third antenna of the receiving terminal; and the third antenna of the receiving terminal is further configured to receive the processed signal from the third communication module of the receiving terminal and directly transmit the processed signal to the source communication module of the video source.

In some embodiments of the present disclosure, the receiving terminal includes a decoding decompression component; the second antenna of the receiving terminal is configured to receive the processed second data from the transmitting terminal and transmit the processed second data to the second communication module of the receiving terminal corresponding to the second antenna; the second communication module of the receiving terminal is configured to receive the processed and encoded and compressed second data from the second antenna and transmit the second data to the decoding decompression component; and the decoding decompression component of the receiving terminal is configured to perform a decoding decompression operation on the received and processed and encoded and compressed second data to generate video data in a format of 4K60fps, and transmit the generated video data to the display terminal through a third interface for displaying.

An embodiment of the present disclosure provides a transmission method implemented by the transmission system, including: enabling a communication between the source communication module of the video source between the third antenna of the receiving terminal through the first communication protocol; and enabling a communication between the first antenna of the transmitting terminal and the second antenna of the receiving terminal through the second communication protocol.

In some embodiments of the present disclosure, the first communication protocol is a WiFi6-based communication protocol; and the second communication protocol is a millimeter wave based communication protocol.

In some embodiments of the present disclosure, the video source further includes an instruction receiving module and an encoding compression component, and the instruction receiving module is configured to output a first instruction signal for transmitting video data from the video source to the transmitting terminal or a second instruction signal for directly transmitting the video data from the video source to the receiving terminal according to a user input.

In some embodiments of the present disclosure, in response to the instruction receiving module outputting the first instruction signal, the transmission method further includes: directly transmitting, by the source communication module of the video source, first data from the video source to the receiving terminal; receiving, by the third antenna of the receiving terminal, the first data from the video source and transmitting the first data to the third communication module corresponding to the third antenna; receiving, by the third communication module of the receiving terminal, the first data from the third antenna, processing the first data, and then transmitting the processed first data to the display terminal through a second interface for displaying; performing, by the encoding compression component of the video source, an encoding compression operation on second data from the video source and transmitting the encoded and compressed second data to the transmitting terminal through the first interface; receiving, by the first communication module of the transmitting terminal, the encoded and compressed second data from the video source, processing the second data, and transmitting the processed second data to the first antenna of the transmitting terminal; and receiving, by the first antenna of the transmitting terminal, the processed second data from the first communication module of the transmitting terminal and transmitting the processed second data to the receiving terminal.

In some embodiments of the present disclosure, in response to the instruction receiving module outputting the second instruction signal, the transmission method further includes: processing, by the encoding compression component, second data from the video source and transmitting the processed second data to the source communication module of the video source; and receiving, by the source communication module of the video source, the processed second data from the encoding compression component and directly transmitting the processed second data to the receiving terminal.

In some embodiments of the present disclosure, the transmitting terminal includes an encoding compression component, and the transmission method further includes: directly transmitting, by the source communication module of the video source, first data from the video source to the receiving terminal; receiving, by the third antenna of the receiving terminal, the first data from the video source and transmitting the first data to the third communication module corresponding to the third antenna; receiving, by the third communication module of the receiving terminal, the first data from the third antenna, processing the first data, and then transmitting the processed first data to the display terminal through a second interface for displaying; transmitting, by the video source, the second data to the transmitting terminal through the first interface; receiving, by the encoding compression component of the transmitting terminal, the second data from the video source, performing an encoding compression operation on the second data from the video source, and transmitting the encoded and compressed second data to the first communication module of the transmitting terminal; receiving, by the first communication module of the transmitting terminal, the encoded and compressed second data, processing the second data, and transmitting the processed second data to the first antenna of the transmitting terminal; and receiving, by the first antenna of the transmitting terminal, the processed second data from the first communication module of the transmitting terminal and transmitting the processed second data to the receiving terminal.

In some embodiments of the present disclosure, the transmission method further includes: receiving, by the third communication module of the receiving terminal, a signal from the display terminal through the second interface, processing the signal, and transmitting the processed signal to the third antenna of the receiving terminal; and receiving, by the third antenna of the receiving terminal, the processed signal from the third communication module of the receiving terminal and directly transmitting the processed signal to the source communication module of the video source.

In some embodiments of the present disclosure, the receiving terminal includes a decoding decompression component, and the transmission method further includes: receiving, by the second antenna of the receiving terminal, the processed second data from the transmitting terminal and transmitting the processed second data to the second communication module of the receiving terminal corresponding to the second antenna; receiving, by the second communication module of the receiving terminal, the processed and encoded and compressed second data from the second antenna and transmitting the second data to the decoding decompression component; and performing, by the decoding decompression component of the receiving terminal, a decoding decompression operation on the received and processed and encoded and compressed second data to generate video data in a format of 4K60fps, and transmitting the generated video data to the display terminal through a third interface for displaying.

Each of the transmission system and the transmission method provided by the present disclosure utilizes both the WiFi6 technology (IEEE 802.11.ax) and the millimeter wave technology (802.11ad), fully utilizes the advantages of these two technologies, and avoids their defects, so that a proper data processing scheme is selected according to the configuration of the video source when the transmission system is applied to the transmission of high definition audio and video signals (even ultra-high definition audio and video signals). Therefore, seamless switching of the data encoding compression mode and the wireless transmission technology is realized, the transmission of the ultra-high definition video with low time delay and high speed is realized, and therefore, the dual ultimate experience including the image fidelity and the livecast is realized, thereby meeting the pursuit of people on the image fidelity of the ultra-high definition video and enjoying the live spectator experience brought by the livecast.

BRIEF DESCRIPTION OF DRAWINGS

The following drawings are merely examples for illustrative purposes according to various disclosed embodiments and are not intended to limit the scope of the present invention.

DETAIL DESCRIPTION OF EMBODIMENTS

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides a transmission system, including: a video source including a source communication module (a WiFi6 communication module) based on a first communication protocol; a transmitting terminal including a first antenna (a millimeter wave antenna) based on a second communication protocol and a first communication module (a millimeter wave communication module) based on the second communication protocol and corresponding to the first antenna; and a receiving terminal including a second antenna (a millimeter wave antenna) based on the second communication protocol and a second communication module (a millimeter wave communication module) based on the second communication protocol and corresponding to the second antenna, a third antenna (a WiFi6 antenna) based on the first communication protocol, and a third communication module (a WiFi6 communication module) based on the first communication protocol and corresponding to the third antenna. The video source is connected to the transmitting terminal through a first interface, the source communication module of the video source is communicated with the third antenna of the receiving terminal based on the first communication protocol, and the first antenna of the transmitting terminal is communicated with the second antenna of the receiving terminal based on the second communication protocol.

Figure 1:
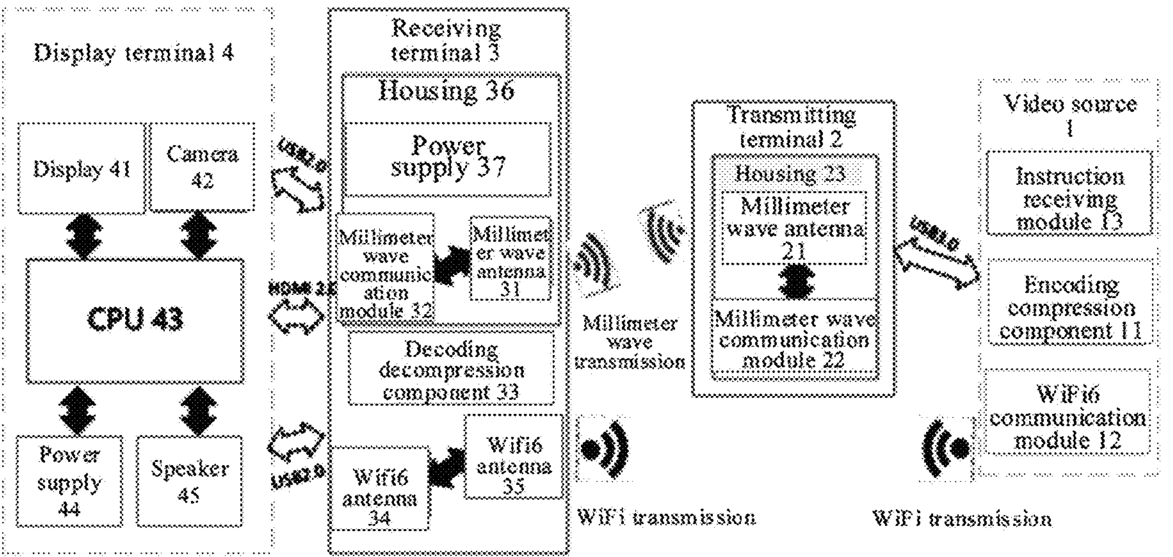
FIG. 1 is a schematic diagram of a structure of a transmission system according to an embodiment of the present disclosure.

One embodiment of the present disclosure is described below with reference to FIG. 1. FIG. 1 is a schematic diagram of a structure of a transmission system according to an embodiment of the present disclosure.

The present disclosure provides a transmission system, including: a video source 1 including a WiFi6 communication module (a source communication module) 12 based on a first communication protocol; a transmitting terminal 2 including a millimeter wave antenna (a first antenna) 21 based on a second communication protocol and a millimeter wave communication module (a first communication module) 22 based on the second communication protocol and corresponding to the millimeter wave antenna 21; and a receiving terminal 3 including a millimeter wave antenna (a second antenna) 31 based on the second communication protocol and a millimeter wave communication module (a second communication module) 32 based on the second communication protocol and corresponding to the millimeter wave antenna 31, a WiFi6 antenna (a third antenna) 35 based on the first communication protocol, and a WiFi6 communication module (a third communication module) 34 based on the first communication protocol and corresponding to the WiFi6 antenna 35. The video source 1 is connected to the transmitting terminal 2 through a first interface (e.g., a USB3.0 interface), the WiFi6 communication module 12 of the video source 1 is communicated with the WiFi6 antenna 35 of the receiving terminal 3 based on the first communication protocol, and the millimeter wave antenna 21 of the transmitting terminal 2 is communicated with the millimeter wave antenna 31 of the receiving terminal 3 based on the second communication protocol.

In some embodiments of the present disclosure, the first communication protocol is a WiFi6-based communication protocol, and the second communication protocol is a millimeter wave based communication protocol.

In some embodiments of the present disclosure, the WiFi6 communication module 12 of the video source 1 is directly communicated with the WiFi6 antenna 35 of the receiving terminal 3 based on the first communication protocol, and the millimeter wave antenna 21 of the transmitting terminal 2 is communicated with the millimeter wave antenna 31 of the receiving terminal 3 based on the second communication protocol.

In some embodiments of the present disclosure, the transmission system further includes a display terminal 4. The display terminal 4 includes a display 41, a power supply 44, a central processing unit (CPU) 43, a camera 42, a speaker 45, and the like.

In some embodiments of the present disclosure, the video source 1 further includes an encoding compression component 11 and an instruction receiving module 13. The instruction receiving module 13 is configured to output a first instruction signal for transmitting video data from the video source to the transmitting terminal or a second instruction signal for directly transmitting the video data from the video source to the receiving terminal according to a user input.

In some embodiments of the present disclosure, when the instruction receiving module 13 is configured to output the first instruction signal, the WiFi6 communication module 12 of the video source 1 is configured to directly transmit first data (e.g., a video content, or a content displayed on a display screen of the video source, or control instructions for controlling the modules) from the video source 1 to the receiving terminal 3. The WiFi6 antenna 35 of the receiving terminal 3 is configured to receive the first data from the video source 1 and transmit the first data to the WiFi6 communication module 34 corresponding to the WiFi6 antenna 35. The WiFi6 communication module 34 of the receiving terminal 3 is configured to receive the first data from the WiFi6 antenna 35 and process the first data, and then transmit the processed first data to the display terminal 4 through a second interface (such as a USB 2.0 interface) for displaying.

In some embodiments of the present disclosure, the encoding compression component 11 of the video source 1 is configured to perform an encoding compression operation on second data (e.g., a video content or an image with an ultra-high definition) from the video source 1 (encoding and compressing the second data), and transmit the second data subjected to the encoding compression operation (the encoded and compressed second data) to the transmitting terminal 2 through the first interface (e.g., the USB3.0 interface). The millimeter wave communication module 22 of the transmitting terminal 2 is configured to receive the encoded and compressed second data from the video source 1, process the second data, and transmit the processed second data to the millimeter wave antenna 21 of the transmitting terminal 2, and the millimeter wave antenna 21 of the transmitting terminal 2 is configured to receive the processed second data from the millimeter wave communication module 22 of the transmitting terminal 2 and transmit the processed second data to the receiving terminal 3.

In some embodiments of the present disclosure, when the instruction receiving module 13 is configured to output the second instruction signal, the encoding compression component 11 is configured to process the second data from the video source 1 and transmit the processed second data to the WiFi6 communication module 12 of the video source 1, and the WiFi6 communication module 12 of the video source 1 is configured to receive the processed second data from the encoding compression component 11 and transmit the processed second data directly to the receiving terminal 3.

In some embodiments of the present disclosure, the receiving terminal 3 includes a decoding decompression component 33. The millimeter wave antenna 31 of the receiving terminal 3 is configured to receive the processed second data from the transmitting terminal 2 and transmit the processed second data to the millimeter wave communication module 32 of the receiving terminal 3 and corresponding to the millimeter wave antenna 31. The millimeter wave communication module 32 of the receiving terminal 3 is configured to receive the processed and encoded and compressed second data from the millimeter wave antenna 31 and transmit the second data to the decoding decompression component 33. The decoding decompression component 33 of the receiving terminal 3 is configured to perform a decoding decompression operation on the received and processed and encoded and compressed second data (decode and decompress the received and processed and encoded and compressed second data) to generate third data in a format of 4K60fps, and transmit the generated third data to the display terminal 4 through a third interface (e.g., an HDMI2.0 interface) for displaying.

In some embodiments of the present disclosure, the WiFi6 communication module 34 of the receiving terminal 3 is further configured to receive a signal (e.g., through the USB2.0 interface) from the display terminal 4 (e.g., a signal from the camera 42 or the speaker 45 of the display terminal 4) and process the signal, so as to transmit the processed signal to the WiFi6 communication module 34 of the receiving terminal 3. The WiFi6 antenna 35 of the receiving terminal 3 is further configured to receive the processed signal from the WiFi6 communication module 34 of the receiving terminal 3, and directly transmit the processed signal to the WiFi6 communication module 12 of the video source 1 in a WiFi6 communication mode.

In some embodiments of the present disclosure, the receiving terminal 3 further includes a power supply 37 configured to supply power to the components in the receiving terminal 3 (including the millimeter wave antenna 31, the millimeter wave communication module 32 corresponding to the millimeter wave antenna 31, the decoding decompression component 33, the WiFi6 antenna 35, and the WiFi6 communication module 34 corresponding to the WiFi6 antenna 35).

In some embodiments of the present disclosure, the receiving terminal 3 further includes a housing 36 for fixing and protecting the components in the receiving terminal 3 (including the millimeter wave antenna 31, the millimeter wave communication module 32 corresponding to the millimeter wave antenna 31, the decoding decompression component 33, the WiFi6 antenna 35, the WiFi6 communication module 34 corresponding to the WiFi6 antenna 35, and the power supply 37).

In some embodiments of the present disclosure, the transmitting terminal 2 further includes a housing 23 for fixing and protecting the components in the transmitting terminal 2 (including the millimeter wave antenna 21 and the millimeter wave communication module 22 corresponding to the millimeter wave antenna 21).

Figure 2:
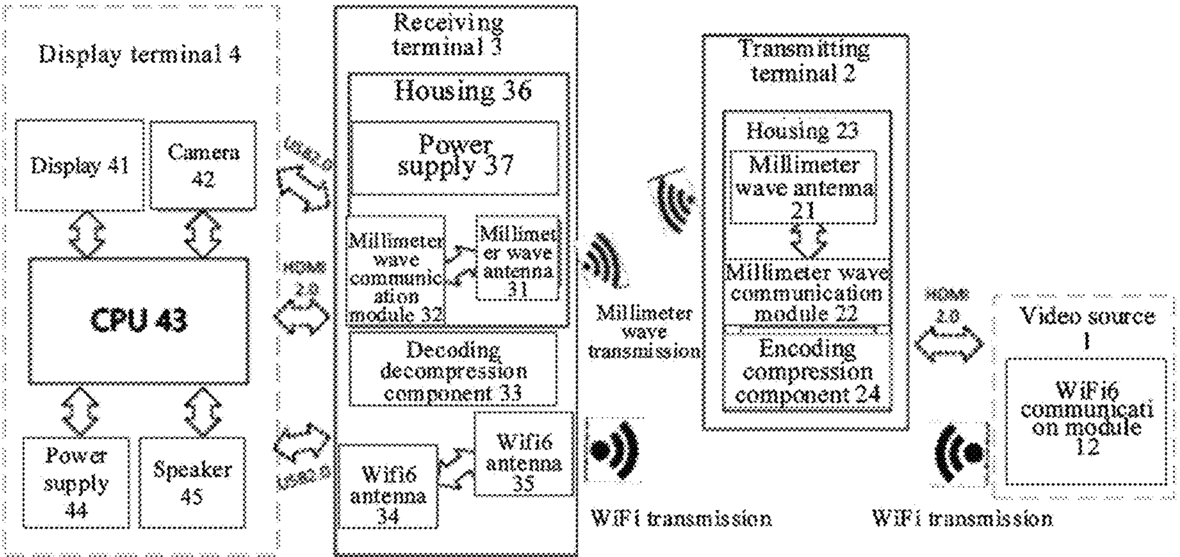
FIG. 2 is a schematic diagram of another structure of a transmission system according to an embodiment of the present disclosure.

Another embodiment of the present disclosure is described below with reference to FIG. 2. FIG. 2 is a schematic diagram of another structure of a transmission system according to an embodiment of the present disclosure.

The present disclosure provides a transmission system, including: a video source 1 including a WiFi6 communication module (a source communication module) 12 based on a first communication protocol; a transmitting terminal 2 including a millimeter wave antenna (a first antenna) 21 based on a second communication protocol and a millimeter wave communication module (a first communication module) 22 based on the second communication protocol and corresponding to the millimeter wave antenna 21; and a receiving terminal 3 including a millimeter wave antenna (a second antenna) 31 based on the second communication protocol and a millimeter wave communication module (a second communication module) 32 based on the second communication protocol and corresponding to the millimeter wave antenna 31, a WiFi6 antenna (a third antenna) 35 based on the first communication protocol, and a WiFi6 communication module (a third communication module) 34 based on the first communication protocol and corresponding to the WiFi6 antenna 35. The video source 1 is connected to the transmitting terminal 2 through a first interface (e.g., a HDMI 2.0), the WiFi6 communication module 12 of the video source 1 is communicated with the WiFi6 antenna 35 of the receiving terminal 3 based on the first communication protocol, and the millimeter wave antenna 21 of the transmitting terminal 2 is communicated with the millimeter wave antenna 31 of the receiving terminal 3 based on the second communication protocol.

In some embodiments of the present disclosure, the first communication protocol is a WiFi6-based communication protocol, and the second communication protocol is a millimeter wave based communication protocol.

In some embodiments of the present disclosure, the WiFi6 communication module 12 of the video source 1 is directly communicated with the WiFi6 antenna 35 of the receiving terminal 3 based on the first communication protocol, and the millimeter wave antenna 21 of the transmitting terminal 2 is communicated with the millimeter wave antenna 31 of the receiving terminal 3 based on the second communication protocol.

In some embodiments of the present disclosure, the transmission system further includes a display terminal 4. The display terminal 4 includes a display 41, a power supply 44, a central processing unit (CPU) 43, a camera 42, a speaker 45, and the like.

In some embodiments of the present disclosure, the WiFi6 communication module 12 of the video source 1 is configured to directly transmit first data (e.g., a video content, or a content displayed on a display screen of the video source, or control instructions for controlling the modules) from the video source 1 to the receiving terminal 3. The WiFi6 antenna 35 of the receiving terminal 3 is configured to receive the first data from the video source 1 and transmit the first data to the WiFi6 communication module 34 corresponding to the WiFi6 antenna 35. The WiFi6 communication module 34 of the receiving terminal 3 is configured to receive the first data from the WiFi6 antenna 35 and process the first data, and then transmit the processed first data to the display terminal 4 through a second interface (such as a USB 2.0 interface) for displaying.

Unlike the embodiment shown in FIG. 1, in the embodiment shown in FIG. 2, the transmitting terminal 2 includes an encoding compression component 24. The video source 1 is configured to transmit the second data (e.g., a video content with an ultra-high definition) to the transmitting terminal 2 through the first interface (e.g., the HDMI2.0 interface). The encoding compression component 24 of the transmitting terminal 2 is configured to receive the second data from the video source 1, perform an encoding compression operation on the second data from the video source 1, and transmit the encoded and compressed second data to the millimeter wave communication module 22 of the transmitting terminal 2. The millimeter wave communication module 22 of the transmitting terminal 2 is configured to receive the encoded and compressed second data, process the second data, and transmit the processed second data to the millimeter wave antenna 21 of the transmitting terminal 2, and the millimeter wave antenna 21 of the transmitting terminal 2 is configured to receive the processed second data from the millimeter wave communication module 22 of the transmitting terminal 2 and transmit the processed second data to the receiving terminal 3.

In some embodiments of the present disclosure, the receiving terminal 3 includes a decoding decompression component 33. The millimeter wave antenna 31 of the receiving terminal 3 is configured to receive the processed second data from the transmitting terminal 2 and transmit the processed second data to the millimeter wave communication module 32 of the receiving terminal 3 and corresponding to the millimeter wave antenna 31. The millimeter wave communication module 32 of the receiving terminal 3 is configured to receive the processed and encoded and compressed second data from the millimeter wave antenna 31 and transmit the second data to the decoding decompression component 33. The decoding decompression component 33 of the receiving terminal 3 is configured to perform a decoding decompression operation on the received and processed and encoded and compressed second data (decode and decompress the received and processed and encoded and compressed second data) to generate third data in a format of 4K60fps, and transmit the generated third data to the display terminal 4 through a third interface (e.g., an HDMI2.0 interface) for displaying.

As the video source 1 cannot perform the encoding compression operation on the video and the transmitting terminal 2 is required to perform the encoding compression operation on the video, the transmitting terminal 2 necessarily has good heat dissipation through design so as to ensure the stable and reliable transmission of the ultra-high definition video.

In some embodiments of the present disclosure, the WiFi6 communication module 34 of the receiving terminal 3 is further configured to receive a signal (e.g., through the USB2.0 interface) from the display terminal 4 (e.g., a signal from the camera 42 or the speaker 45 of the display terminal 4) and process the signal, so as to transmit the processed signal to the WiFi6 communication module 34 of the receiving terminal 3. The WiFi6 antenna 35 of the receiving terminal 3 is further configured to receive the processed signal from the WiFi6 communication module 34 of the receiving terminal 3, and directly transmit the processed signal to the WiFi6 communication module 12 of the video source 1 in a WiFi6 communication mode.

In some embodiments of the present disclosure, the receiving terminal 3 further includes a power supply 37 configured to supply power to the components in the receiving terminal 3 (including the millimeter wave antenna 31, the millimeter wave communication module 32 corresponding to the millimeter wave antenna 31, the decoding decompression component 33, the WiFi6 antenna 35, and the WiFi6 communication module 34 corresponding to the WiFi6 antenna 35).

In some embodiments of the present disclosure, the receiving terminal 3 further includes a housing 36 for fixing and protecting the components in the receiving terminal 3

(including the millimeter wave antenna 31, the millimeter wave communication module 32 corresponding to the millimeter wave antenna 31, the decoding decompression component 33, the WiFi6 antenna 35, the WiFi6 communication module 34 corresponding to the WiFi6 antenna 35, and the power supply 37).

In some embodiments of the present disclosure, the transmitting terminal 2 further includes a housing 23 for fixing and protecting the components in the transmitting terminal 2 (including the millimeter wave antenna 21, the millimeter wave communication module 22 corresponding to the millimeter wave antenna 21, and the encoding compression component 24).

The transmission system provided by the present disclosure utilizes both the WiFi6 technology (IEEE 802.11.ax) and the millimeter wave technology (802.11ad), fully utilizes the advantages of such the two technologies, and avoids their defects, so that a proper data processing scheme is selected according to the configuration (as shown in FIG. 1 or FIG. 2) of the video source (or the millimeter wave technology or the WiFi6 technology is selected by a user to transmit the videos) when the transmission system is applied to the transmission of high definition audio and video signals (even ultra-high definition audio and video signals). Therefore, seamless switching of the data encoding compression mode and the wireless transmission technology is realized, the transmission of the ultra-high definition video with low time delay and high speed is realized, and therefore, the dual ultimate experience including the image fidelity and the livecast is realized, thereby meeting the pursuit of people on the image fidelity of the ultra-high definition video and enjoying the live spectator experience brought by the livecast.

Alternatively, in the transmission system provided by the present disclosure, the user may transmit the video content through the WiFi6 communication module 12 of the video source 1 by choice. The video content transmitted in this way is less clear than that transmitted by the millimeter wave technology due to the large loss of the definition caused by the compression for the video content.

Figure 3:
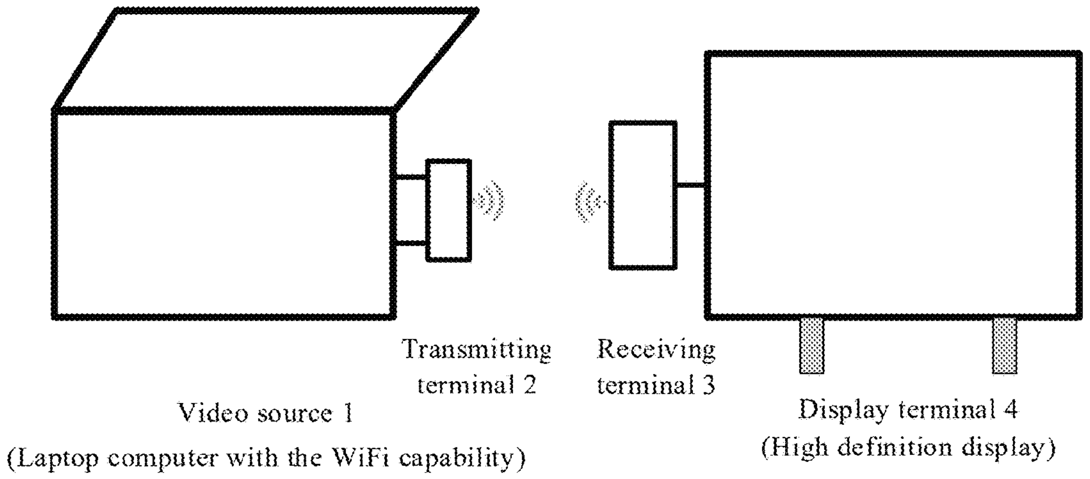
FIG. 3 illustrates a specific application of a transmission system according to an embodiment of the present disclosure.

FIG. 3 illustrates a specific application of a transmission system according to an embodiment of the present disclosure. In some embodiments of the present disclosure, as shown in FIG. 3, the video source 1 may be a laptop computer or the like with the WiFi capability. However, the present disclosure is not limited thereto. In other embodiments of the present disclosure, the video source 1 may be other electronic product with the WiFi capability, such as ipad or the like.

In some embodiments of the present disclosure, as shown in FIG. 3, the display terminal 4 may be a high definition display. However, the present disclosure is not limited thereto. In other embodiments of the present disclosure, the display terminal 4 may be other types of displays capable of playing high definition video.

In some embodiments of the present disclosure, a software application is pre-installed in the video source 1 to determine whether the WiFi6 function is enabled to facilitate the transmission of the video. The WiFi6 function is not enabled if the encoding compression operation is performed in the video source 1 (i.e., as shown in FIG. 1, the video source 1 includes the encoding compression component 11 configured to perform the encoding compression operation on the second data (e.g., a video content or an image with an ultra-high definition) from the video source 1, and the transmitting terminal 2 does not include such the encoding compression component 11). The WiFi6 function is enabled to facilitate the transmission of the video if no encoding compression operation is performed in the video source 1 (i.e., as shown in FIG. 2, the transmitting terminal 2 includes the encoding compression component 24 configured to receive the second data from the video source 1, and perform the encoding compression operation on the second data from the video source 1, and the video source 1 does not include such the encoding compression component 11). In the embodiments shown in FIGS. 1 and 2, the software application is pre-installed in the video source 1.

In some embodiments of the present disclosure, the video source 1 includes a video output interface, including, but not limited to, USB Type-C, DP (Display Port), HDMI (High Definition Multimedia Interface), or the like, and a processor of the video source 1 has a configuration having Core i7 or better, the RAM of 8 GB or more, and an operating system of Windows 10, so that the encoding efficiency of the ultra-high definition video is ensured, and the real-time encoding requirement on the ultra-high definition video is met.

In some embodiments of the present disclosure, the encoding compression mode includes: an MPEG (Moving Picture Experts Group) digital video format and an AVI (Audio Video Interactive) digital video format.

As shown in FIG. 3, in some embodiments of the present disclosure, the transmitting terminal 2 as a USB network device is directly connected to the video source 1. If the WiFi6 network needs to be used, it is necessary to connect the transmitting terminal 2, and then enable the WiFi6 connection.

In some embodiments of the present disclosure, a maximum transmission bandwidth of the USB 2.0 interface is 480 Mbps, and a maximum transmission bandwidth of the USB 3.0 interface is up to 5.0 Gbps. The bandwidth of the USB 3.0 interface can satisfy the transmission of mass data of the ultra-high definition content. The USB 2.0 interface is used for transmitting data from the camera and the loudspeaker of the display terminal 4.

In some embodiments of the present disclosure, the display terminal 4 may further have a touch function. By the user performing a touch operation on the display terminal 4, the receiving terminal 3 is configured to receive touch data generated by a touch event and transmit the touch data to the millimeter wave communication module 32 of the receiving terminal 3 to generate a corresponding control signal, so as to control the receiving terminal 3 through the touch function of the display terminal 4.

Figure 4:
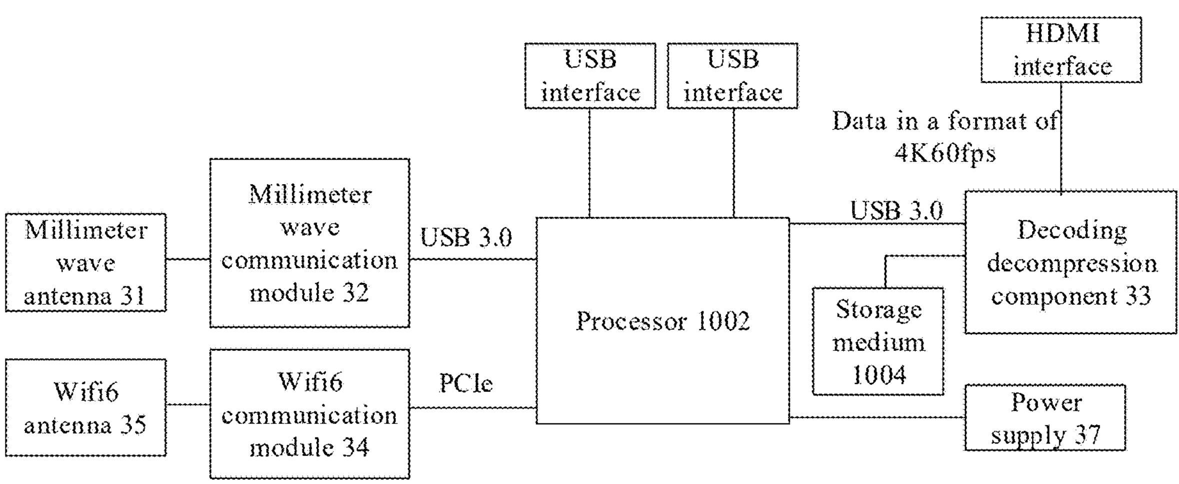
FIG. 4 illustrates a specific structure of a receiving terminal of a transmission system according to an embodiment of the present disclosure.

The specific configuration of the receiving terminal 3 is described below with reference to FIG. 4. FIG. 4 illustrates a specific structure of a receiving terminal of a transmission system according to an embodiment of the present disclosure.

As shown in FIG. 4, in some embodiments of the present disclosure, the receiving terminal 3 includes a processor 1002, a storage medium 1004, the millimeter wave antenna (the second antenna) 31 and the millimeter wave communication module (the second communication module) 32 corresponding to the millimeter wave antenna 31, the WiFi6 antenna (the third antenna) 35 and the WiFi6 communication module (the third communication module) 34 corresponding to the WiFi6 antenna 35, the decoding decompression component 33, and a plurality of I/O interfaces. Some devices may be omitted and other devices may be included to better describe the relevant embodiments.

In some embodiments of the present disclosure, the plurality of I/O interfaces include two USB 3.0 interfaces respectively configured to connect the millimeter wave communication module 32 to the processor 1002, and connect the decoding decompression component 33 to the processor 1002, a PCIe (Peripheral Component Interface Express) interface configured to connect the WiFi6 communication module 34 to the processor 1002, an HDMI interface configured to output data in 4K60fps format generated by the processing of the decoding decompression component 33 to the display terminal 4 and two USB (USB 2.0) interfaces configured to enable the communication between the receiving terminal 3 and the display terminal 4.

The HDMI interface and the PCIe interface may be used for the transmission of the mass data of the ultra-high definition video content.

The processor 1002 may include any suitable processor or processors. The processor 1002 may include multiple cores for multi-threading or parallel processing. The processor 1002 may execute sequences of computer program instructions to perform the various processes.

The storage medium 1004 may include a memory module (e.g., ROM, RAM, or a flash module), a mass storage (e.g., CD-ROM or a hard disk), or the like. The storage medium 1004 may store a computer program thereon to implement various processes when the computer program is executed by the processor 1002. For example, the storage medium 1004 may store a computer program thereon to implement various algorithms when the computer program is executed by the processor 1002. The storage medium 1004 may store all video content or image content transmitted from the transmitting terminal 2 so as to be viewed by a user at any time after the live when the user cannot view the live in real time for some reason.

The operations of the millimeter wave antenna 31, the millimeter wave communication module 32 corresponding to the millimeter wave antenna 31, the WiFi6 antenna 35, the WiFi6 communication module 34 corresponding to the WiFi6 antenna 35, and the decoding decompression component 33 have been described above, and therefore will not be repeated.

It will be understood by a person skilled in the art that all or some of steps of the method, functional modules/units in the system and the device disclosed above may be implemented as software, firmware, hardware, or suitable combinations thereof. In a hardware implementation, a division among functional modules/units mentioned in the above description does not necessarily correspond to the division among physical components. For example, one physical component may have a plurality of functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on a computer-readable storage medium, which may include a computer storage medium (or a non-transitory medium) and a communication medium (or a transitory medium). The term computer storage medium includes volatile and nonvolatile, removable and non-removable media implemented in any method or technology for storage of information, such as computer readable instructions, data structures, program modules or other data, as is well known to one of ordinary skill in the art. A computer storage medium includes, but is not limited to, RAM, ROM, EEPROM, flash memory or other memory technology, CD-ROM, Digital Versatile Disk (DVD) or other optical disk storage, magnetic cassette, magnetic tape, magnetic disk storage or other magnetic storage device, or any other medium which may be used to store desired information, and which may be accessed by a computer. In addition, a communication medium typically embodies computer readable instructions, data structures, program modules or other data in a modulated data signal such as a carrier wave or other transport mechanism, and includes any information delivery medium, as is well known to one of ordinary skill in the art.

The flowchart and block diagrams in the drawings illustrate architecture, functionality, and operation of possible implementations of a device, a method and a computer program product according to various embodiments of the present disclosure. In this regard, each block in the flowchart or block diagrams may represent a module, program segment(s), or a portion of a code, which includes at least one executable instruction for implementing specified logical function(s). It should also be noted that, in some alternative implementations, functions noted in the blocks may occur out of the order noted in the drawings. For example, two blocks being successively connected may, in fact, be performed substantially concurrently, or the blocks may sometimes be performed in the reverse order, depending upon the functionality involved. It will also be noted that each block of the block diagrams and/or flowchart, and combinations of blocks in the block diagrams and/or flowchart, may be implemented by special purpose hardware-based systems that perform the specified functions or operations, or combinations of special purpose hardware and computer instructions.

In a second aspect, the present disclosure provides a transmission method. The transmission method is implemented by the transmission system according to the first aspect. The transmission system includes: a video source including a source communication module based on a first communication protocol; a transmitting terminal including a first antenna based on a second communication protocol and a first communication module based on the second communication protocol and corresponding to the first antenna; and a receiving terminal including a second antenna based on the second communication protocol and a second communication module based on the second communication protocol and corresponding to the second antenna, a third antenna based on the first communication protocol, and a third communication module based on the first communication protocol and corresponding to the third antenna; wherein the video source is connected to the transmitting terminal through a first interface. The source communication module of the video source is communicated with the third antenna of the receiving terminal based on the first communication protocol. The first antenna of the transmitting terminal is communicated with the second antenna of the receiving terminal based on the second communication protocol.

Figure 5:
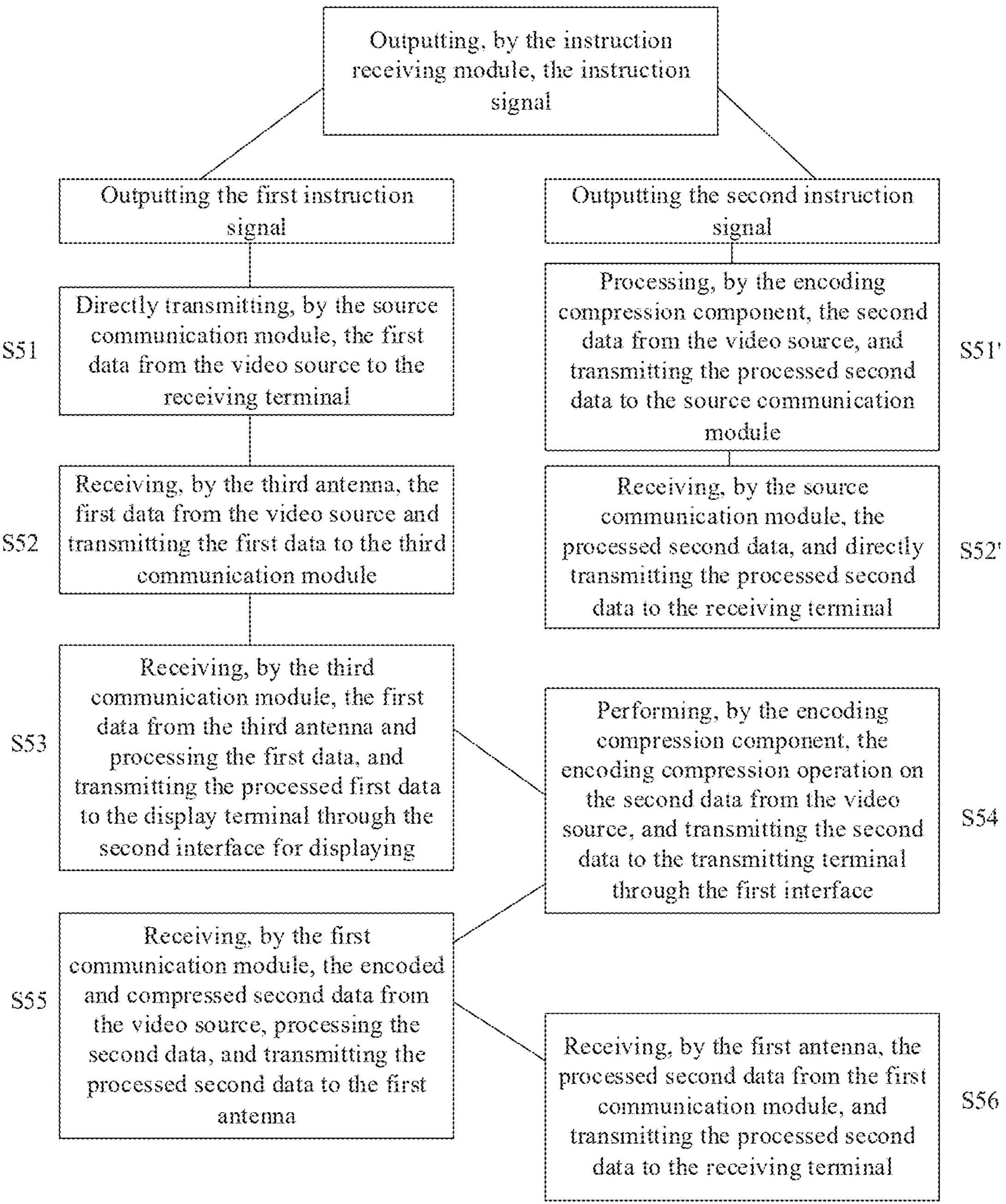
FIG. 5 illustrates a flow chart of a transmission method implemented by the transmission system shown in FIG. 1.

FIG. 5 illustrates a flow chart of a transmission method implemented by the transmission system shown in FIG. 1. The transmission method of the present disclosure includes steps S51 to S56.

The instruction receiving module outputs the first instruction signal.

The step S51 includes directly transmitting, by the source communication module of the video source, the first data from the video source to the receiving terminal.

The step S52 includes receiving, by the third antenna of the receiving terminal, the first data from the video source and transmitting the first data to the third communication module corresponding to the third antenna.

The step S53 includes receiving, by the third communication module of the receiving terminal, the first data from the third antenna and processing the first data, and transmitting the processed first data to the display terminal through the second interface for displaying.

The step S54 includes performing, by the encoding compression component of the video source, the encoding compression operation on the second data from the video source, and transmitting the encoded and compressed second data to the transmitting terminal through the first interface.

The step S55 includes receiving, by the first communication module of the transmitting terminal, the encoded and compressed second data from the video source, processing the second data, and transmitting the processed second data to the first antenna of the transmitting terminal.

The step S56 includes receiving, by the first antenna of the transmitting terminal, the processed second data from the first communication module of the transmitting terminal, and transmitting the processed second data to the receiving terminal.

When the instruction receiving module outputs the second instruction signal, the transmission method of the present disclosure further includes the following steps S51' and S52'.

The step S51' includes processing, by the encoding compression component, the second data from the video source, and transmitting the processed second data to the source communication module of the video source.

The step S52' includes receiving, by the source communication module of the video source, the processed second data from the encoding compression component, and directly transmitting the processed second data to the receiving terminal.

In some embodiments of the present disclosure, the transmission method of the present disclosure further includes: receiving, by the third communication module of the receiving terminal, a signal from the display terminal through the second interface and processing the signal, and transmitting the processed signal to the third antenna of the receiving terminal; and receiving, by the third antenna of the receiving terminal, the processed signal from the third communication module of the receiving terminal, and directly transmitting the processed signal to the source communication module of the video source.

In some embodiments of the present disclosure, the transmission method of the present disclosure further includes: receiving, by the second antenna of the receiving terminal, the processed second data from the transmitting terminal, and transmitting the processed second data to the second communication module of the receiving terminal corresponding to the second antenna; receiving, by the second communication module of the receiving terminal, the processed and encoded and compressed second data from the second antenna, and transmitting the second data to the decoding decompression component; and performing, by the decoding decompression component of the receiving terminal, the decoding decompression operation on the received and processed and encoded and compressed second data to generate video data in a format of 4K60fps, and transmitting the generated video data to the display terminal through the third interface for displaying.

Figure 6:
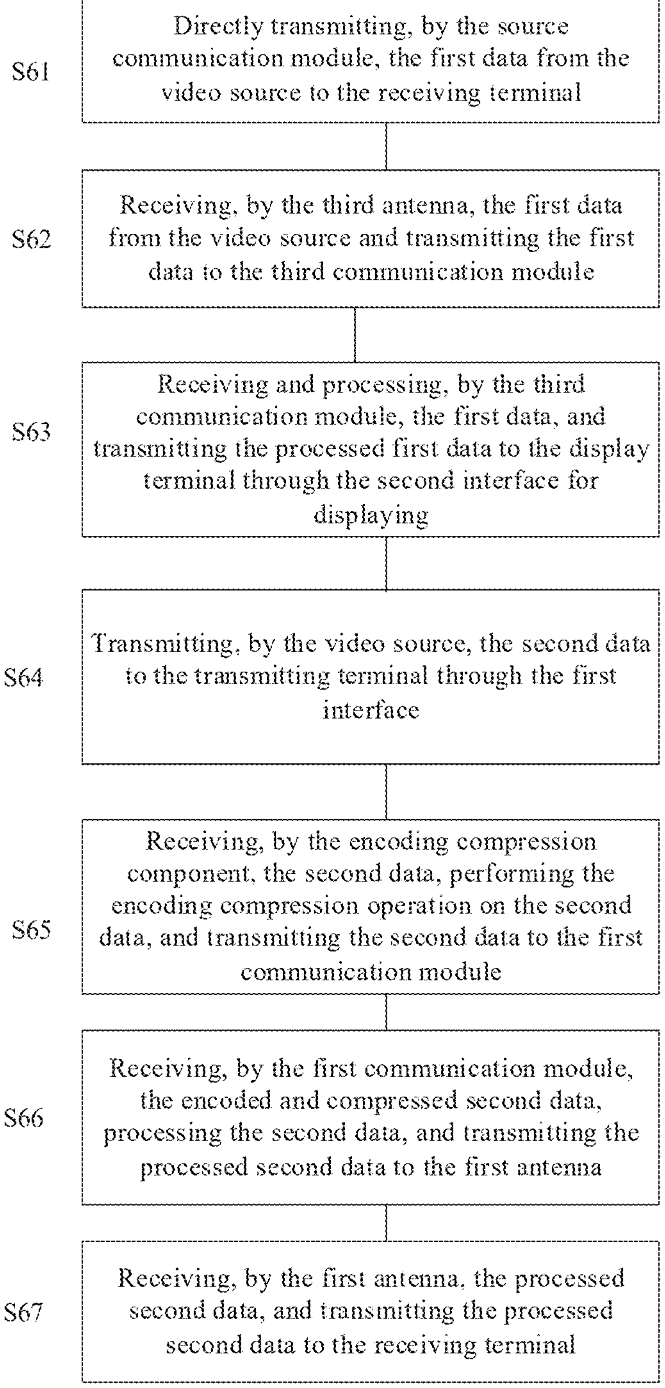
FIG. 6 illustrates a flow chart of a transmission method implemented by the transmission system shown in FIG. 2.

FIG. 6 illustrates a flow chart of a transmission method implemented by the transmission system shown in FIG. 2. The transmission method of the present disclosure includes steps S61 to S67.

The step S61 includes directly transmitting, by the source communication module of the video source, the first data from the video source to the receiving terminal.

The step S62 includes receiving, by the third antenna of the receiving terminal, the first data from the video source and transmitting the first data to the third communication module corresponding to the third antenna.

The step S63 includes receiving, by the third communication module of the receiving terminal, the first data from the third antenna and processing the first data, and transmitting the processed first data to the display terminal through the second interface for displaying.

The step S64 includes transmitting, by the video source, the second data to the transmitting terminal through the first interface.

The step S65 includes receiving, by the encoding compression component of the transmitting terminal, the second data from the video source, performing the encoding compression operation on the second data from the video source, and transmitting the encoded and compressed second data to the first communication module of the transmitting terminal.

The step S66 includes receiving, by the first communication module of the transmitting terminal, the encoded and compressed second data, processing the second data, and transmitting the processed second data to the first antenna of the transmitting terminal.

The step S67 includes receiving, by the first antenna of the transmitting terminal, the processed second data from the first communication module of the transmitting terminal, and transmitting the processed second data to the receiving terminal.

In some embodiments of the present disclosure, the transmission method of the present disclosure further includes: receiving, by the third communication module of the receiving terminal, a signal from the display terminal through the second interface and processing the signal, and transmitting the processed signal to the third antenna of the receiving terminal; and receiving, by the third antenna of the receiving terminal, the processed signal from the third communication module of the receiving terminal, and directly transmitting the processed signal to the source communication module of the video source.

In some embodiments of the present disclosure, the transmission method of the present disclosure further includes: receiving, by the second antenna of the receiving terminal, the processed second data from the transmitting terminal, and transmitting the processed second data to the second communication module of the receiving terminal corresponding to the second antenna; receiving, by the second communication module of the receiving terminal, the processed and encoded and compressed second data from the second antenna, and transmitting the second data to the decoding decompression component; and performing, by the decoding decompression component of the receiving terminal, the decoding decompression operation on the received and processed and encoded and compressed second data to generate video data in a format of 4K60fps, and transmitting the generated video data to the display terminal through the third interface for displaying.

The transmission method provided by the present disclosure utilizes both the WiFi6 technology (IEEE 802.11.ax) and the millimeter wave technology (802.11ad), fully utilizes the advantages of such the two technologies, and avoids their defects, so that a proper data processing scheme is selected according to the configuration (as shown in FIG. 1 or FIG. 2) of the video source (or the millimeter wave technology or the WiFi6 technology is selected by a user to transmit the videos) when the transmission system is applied to the transmission of high definition audio and video signals (even ultra-high definition audio and video signals). Therefore, seamless switching of the data encoding compression mode and the wireless transmission technology is realized, the transmission of the ultra-high definition video with low time delay and high speed is realized, and therefore, the dual ultimate experience including the image fidelity and the livecast is realized, thereby meeting the pursuit of people on the image fidelity of the ultra-high definition video and enjoying the live spectator experience brought by the livecast.

Various illustrative operations described in connection with the configurations disclosed herein may be implemented as electronic hardware, computer software, or combinations of both. Such operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable a person skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term “the invention”, “the present invention” or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use “first”, “second”, etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by a person skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A transmission system, comprising:

a video source comprising a source communication module based on a first communication protocol;

a transmitting terminal comprising a first antenna based on a second communication protocol, and a first communication module based on the second communication protocol and arranged corresponding to the first antenna; and a receiving terminal comprising a second antenna based on the second communication protocol, a second communication module based on the second communication protocol and arranged corresponding to the second antenna, a third antenna based on the first communication protocol, and a third communication module based on the first communication protocol and arranged corresponding to the third antenna; wherein the video source is connected to the transmitting terminal through a first interface, wherein the source communication module of the video source is communicated with the third antenna of the receiving terminal based on the first communication protocol, and the first antenna of the transmitting terminal is communicated with the second antenna of the receiving terminal based on the second communication protocol;

the transmission system further comprises a display terminal;

the first communication protocol is a WiFi6-based communication protocol; and the second communication protocol is a millimeter wave based communication protocol;

the video source further comprises an instruction receiving module and an encoding compression component, and the instruction receiving module is configured to output a first instruction signal for transmitting video data from the video source to the transmitting terminal or a second instruction signal for directly transmitting the video data from the video source to the receiving terminal according to a user input;

wherein in response to the instruction receiving module outputting the first instruction signal, the source communication module of the video source is configured to directly transmit first data from the video source to the receiving terminal;

the third antenna of the receiving terminal is configured to receive the first data from the video source and transmit the first data to the third communication module arranged corresponding to the third antenna;

the third communication module of the receiving terminal is configured to receive the first data from the third antenna, process the first data, and then transmit the processed first data to the display terminal through a second interface for displaying;

the encoding compression component of the video source is configured to perform an encoding compression operation on second data from the video source and transmit the encoded and compressed second data to the transmitting terminal through the first interface;

the first communication module of the transmitting terminal is configured to receive the encoded and compressed second data from the video source, process the second data, and transmit the processed second data to the first antenna of the transmitting terminal; and the first antenna of the transmitting terminal is configured to receive the processed second data from the first communication module of the transmitting terminal and transmit the processed second data to the receiving terminal.

2. The transmission system according to claim 1, wherein in response to the instruction receiving module outputting the second instruction signal, the encoding compression component is configured to process second data from the video source and transmit the processed second data to the source communication module of the video source; and the source communication module of the video source is configured to receive the processed second data from the encoding compression component and directly transmit the processed second data to the receiving terminal.

3. A transmission system, comprising:

a video source comprising a source communication module based on a first communication protocol;

a transmitting terminal comprising a first antenna based on a second communication protocol, and a first communication module based on the second communication protocol and arranged corresponding to the first antenna; and a receiving terminal comprising a second antenna based on the second communication protocol, a second communication module based on the second communication protocol and arranged corresponding to the second antenna, a third antenna based on the first communication protocol, and a third communication module based on the first communication protocol and arranged corresponding to the third antenna; wherein the video source is connected to the transmitting terminal through a first interface, wherein the source communication module of the video source is communicated with the third antenna of the receiving terminal based on the first communication protocol, and the first antenna of the transmitting terminal is communicated with the second antenna of the receiving terminal based on the second communication protocol;

the transmission system further comprises a display terminal;

the first communication protocol is a WiFi6-based communication protocol; and the second communication protocol is a millimeter wave based communication protocol, wherein the transmitting terminal comprises an encoding compression component;

the source communication module of the video source is configured to directly transmit first data from the video source to the receiving terminal;

the third antenna of the receiving terminal is configured to receive the first data from the video source and transmit the first data to the third communication module arranged corresponding to the third antenna;

the third communication module of the receiving terminal is configured to receive the first data from the third antenna, process the first data, and then transmit the processed first data to the display terminal through a second interface for displaying;

the video source is configured to transmit the second data to the transmitting terminal through the first interface;

the encoding compression component of the transmitting terminal is configured to receive the second data from the video source, perform an encoding compression operation on the second data from the video source, and transmit the encoded and compressed second data to the first communication module of the transmitting terminal;

the first communication module of the transmitting terminal is configured to receive the encoded and compressed second data, process the second data, and transmit the processed second data to the first antenna of the transmitting terminal; and the first antenna of the transmitting terminal is configured to receive the processed second data from the first communication module of the transmitting terminal and transmit the processed second data to the receiving terminal.

4. The transmission system according to claim 1, wherein the third communication module of the receiving terminal is further configured to receive a signal from the display terminal through the second interface, process the signal, and transmit the processed signal to the third antenna of the receiving terminal; and the third antenna of the receiving terminal is further configured to receive the processed signal from the third communication module of the receiving terminal and directly transmit the processed signal to the source communication module of the video source.

5. The transmission system according to claim 1, wherein the receiving terminal comprises a decoding decompression component;

the second antenna of the receiving terminal is configured to receive the processed second data from the transmitting terminal and transmit the processed second data to the second communication module of the receiving terminal arranged corresponding to the second antenna;

the second communication module of the receiving terminal is configured to receive the processed and encoded and compressed second data from the second antenna and transmit the second data to the decoding decompression component; and the decoding decompression component of the receiving terminal is configured to perform a decoding decompression operation on the received and processed and encoded and compressed second data to generate video data in a format of 4K60fps, and transmit the generated video data to the display terminal through a third interface for displaying.

6. A transmission method implemented by the transmission system according to claim 1, comprising:

enabling a communication between the source communication module of the video source and the third antenna of the receiving terminal through the first communication protocol; and enabling a communication between the first antenna of the transmitting terminal and the second antenna of the receiving terminal through the second communication protocol;

wherein in response to the instruction receiving module outputting the first instruction signal, the transmission method further comprises:

directly transmitting, by the source communication module of the video source, first data from the video source to the receiving terminal;

receiving, by the third antenna of the receiving terminal, the first data from the video source and transmitting the first data to the third communication module arranged corresponding to the third antenna;

receiving, by the third communication module of the receiving terminal, the first data from the third antenna, processing the first data, and then transmitting the processed first data to the display terminal through a second interface for displaying;

performing, by the encoding compression component of the video source, an encoding compression operation on second data from the video source and transmitting the encoded and compressed second data to the transmitting terminal through the first interface;

receiving, by the first communication module of the transmitting terminal, the encoded and compressed second data from the video source, processing the second data, and transmitting the processed second data to the first antenna of the transmitting terminal; and receiving, by the first antenna of the transmitting terminal, the processed second data from the first communication module of the transmitting terminal and transmitting the processed second data to the receiving terminal.

7. The transmission method according to claim 6, wherein in response to the instruction receiving module outputting the second instruction signal, the transmission method further comprises:

processing, by the encoding compression component, second data from the video source and transmitting the processed second data to the source communication module of the video source; and receiving, by the source communication module of the video source, the processed second data from the encoding compression component and directly transmitting the processed second data to the receiving terminal.

8. A transmission method implemented by the transmission system according to claim 3, comprising:

enabling a communication between the source communication module of the video source and the third antenna of the receiving terminal through the first communication protocol; and enabling a communication between the first antenna of the transmitting terminal and the second antenna of the receiving terminal through the second communication protocol, wherein the transmitting terminal comprises an encoding compression component, and the transmission method further comprises:

directly transmitting, by the source communication module of the video source, first data from the video source to the receiving terminal;

receiving, by the third antenna of the receiving terminal, the first data from the video source and transmitting the first data to the third communication module arranged corresponding to the third antenna;

receiving, by the third communication module of the receiving terminal, the first data from the third antenna, processing the first data, and then transmitting the processed first data to the display terminal through a second interface for displaying;

transmitting, by the video source, the second data to the transmitting terminal through the first interface;

receiving, by the encoding compression component of the transmitting terminal, the second data from the video source, performing an encoding compression operation on the second data from the video source, and transmitting the encoded and compressed second data to the first communication module of the transmitting terminal;

receiving, by the first communication module of the transmitting terminal, the encoded and compressed second data, processing the second data, and transmitting the processed second data to the first antenna of the transmitting terminal; and receiving, by the first antenna of the transmitting terminal, the processed second data from the first communication module of the transmitting terminal and transmitting the processed second data to the receiving terminal.

9. The transmission method according to claim 6, further comprising:

receiving, by the third communication module of the receiving terminal, a signal from the display terminal through the second interface, processing the signal, and transmitting the processed signal to the third antenna of the receiving terminal; and receiving, by the third antenna of the receiving terminal, the processed signal from the third communication module of the receiving terminal and directly transmitting the processed signal to the source communication module of the video source.

10. The transmission method according to claim 6, wherein the receiving terminal comprises a decoding decompression component, and the transmission method further comprises:

receiving, by the second antenna of the receiving terminal, the processed second data from the transmitting terminal and transmitting the processed second data to the second communication module of the receiving terminal corresponding to the second antenna;

receiving, by the second communication module of the receiving terminal, the processed and encoded and compressed second data from the second antenna and transmitting the second data to the decoding decompression component; and performing, by the decoding decompression component of the receiving terminal, a decoding decompression operation on the received and processed and encoded and compressed second data to generate video data in a format of 4K60fps, and transmitting the generated video data to the display terminal through a third interface for displaying.

11. The transmission system according to claim 2, wherein the third communication module of the receiving terminal is further configured to receive a signal from the display terminal through the second interface, process the signal, and transmit the processed signal to the third antenna of the receiving terminal; and the third antenna of the receiving terminal is further configured to receive the processed signal from the third communication module of the receiving terminal and directly transmit the processed signal to the source communication module of the video source.

12. The transmission system according to claim 2, wherein the receiving terminal comprises a decoding decompression component;

the second antenna of the receiving terminal is configured to receive the processed second data from the transmitting terminal and transmit the processed second data to the second communication module of the receiving terminal arranged corresponding to the second antenna;

the second communication module of the receiving terminal is configured to receive the processed and encoded and compressed second data from the second antenna and transmit the second data to the decoding decompression component; and the decoding decompression component of the receiving terminal is configured to perform a decoding decompression operation on the received and processed and encoded and compressed second data to generate video data in a format of 4K60fps, and transmit the generated video data to the display terminal through a third interface for displaying.

13. The transmission method according to claim 7, further comprising:

receiving, by the third communication module of the receiving terminal, a signal from the display terminal through the second interface, processing the signal, and transmitting the processed signal to the third antenna of the receiving terminal; and receiving, by the third antenna of the receiving terminal, the processed signal from the third communication module of the receiving terminal and directly transmitting the processed signal to the source communication module of the video source.

14. The transmission method according to claim 7, wherein the receiving terminal comprises a decoding decompression component, and the transmission method further comprises:

receiving, by the second antenna of the receiving terminal, the processed second data from the transmitting terminal and transmitting the processed second data to the second communication module of the receiving terminal corresponding to the second antenna;

receiving, by the second communication module of the receiving terminal, the processed and encoded and compressed second data from the second antenna and transmitting the second data to the decoding decompression component; and performing, by the decoding decompression component of the receiving terminal, a decoding decompression operation on the received and processed and encoded and compressed second data to generate video data in a format of 4K60fps, and transmitting the generated video data to the display terminal through a third interface for displaying.

15. The transmission system according to claim 3, wherein the third communication module of the receiving terminal is further configured to receive a signal from the display terminal through the second interface, process the signal, and transmit the processed signal to the third antenna of the receiving terminal; and the third antenna of the receiving terminal is further configured to receive the processed signal from the third communication module of the receiving terminal and directly transmit the processed signal to the source communication module of the video source.

16. The transmission system according to claim 3, wherein the receiving terminal comprises a decoding decompression component;

the second antenna of the receiving terminal is configured to receive the processed second data from the transmitting terminal and transmit the processed second data to the second communication module of the receiving terminal arranged corresponding to the second antenna;

the second communication module of the receiving terminal is configured to receive the processed and encoded and compressed second data from the second antenna and transmit the second data to the decoding decompression component; and the decoding decompression component of the receiving terminal is configured to perform a decoding decompression operation on the received and processed and encoded and compressed second data to generate video data in a format of 4K60fps, and transmit the generated video data to the display terminal through a third interface for displaying.

17. The transmission method according to claim 8, further comprising:

receiving, by the third communication module of the receiving terminal, a signal from the display terminal through the second interface, processing the signal, and transmitting the processed signal to the third antenna of the receiving terminal; and receiving, by the third antenna of the receiving terminal, the processed signal from the third communication module of the receiving terminal and directly transmitting the processed signal to the source communication module of the video source.

18. The transmission method according to claim 8, wherein the receiving terminal comprises a decoding decompression component, and the transmission method further comprises:

receiving, by the second antenna of the receiving terminal, the processed second data from the transmitting terminal and transmitting the processed second data to the second communication module of the receiving terminal corresponding to the second antenna;

receiving, by the second communication module of the receiving terminal, the processed and encoded and compressed second data from the second antenna and transmitting the second data to the decoding decompression component; and performing, by the decoding decompression component of the receiving terminal, a decoding decompression operation on the received and processed and encoded and compressed second data to generate video data in a format of 4K60fps, and transmitting the generated video data to the display terminal through a third interface for displaying.

* * * * *